Figure 5:
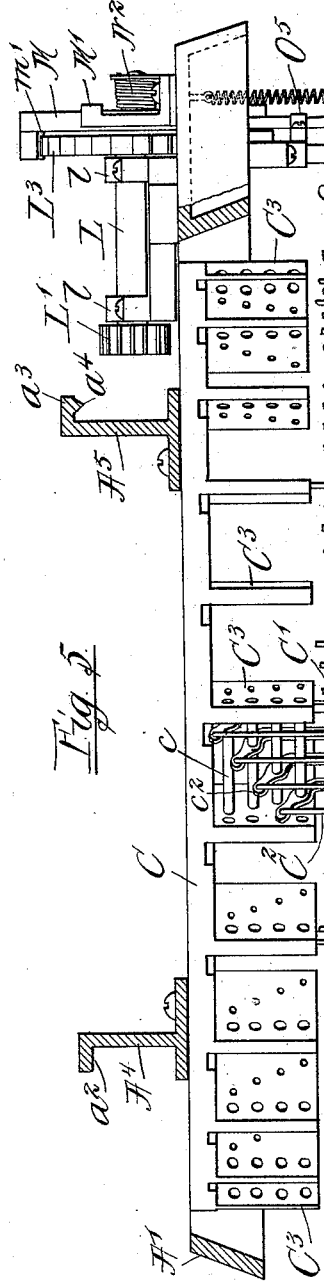

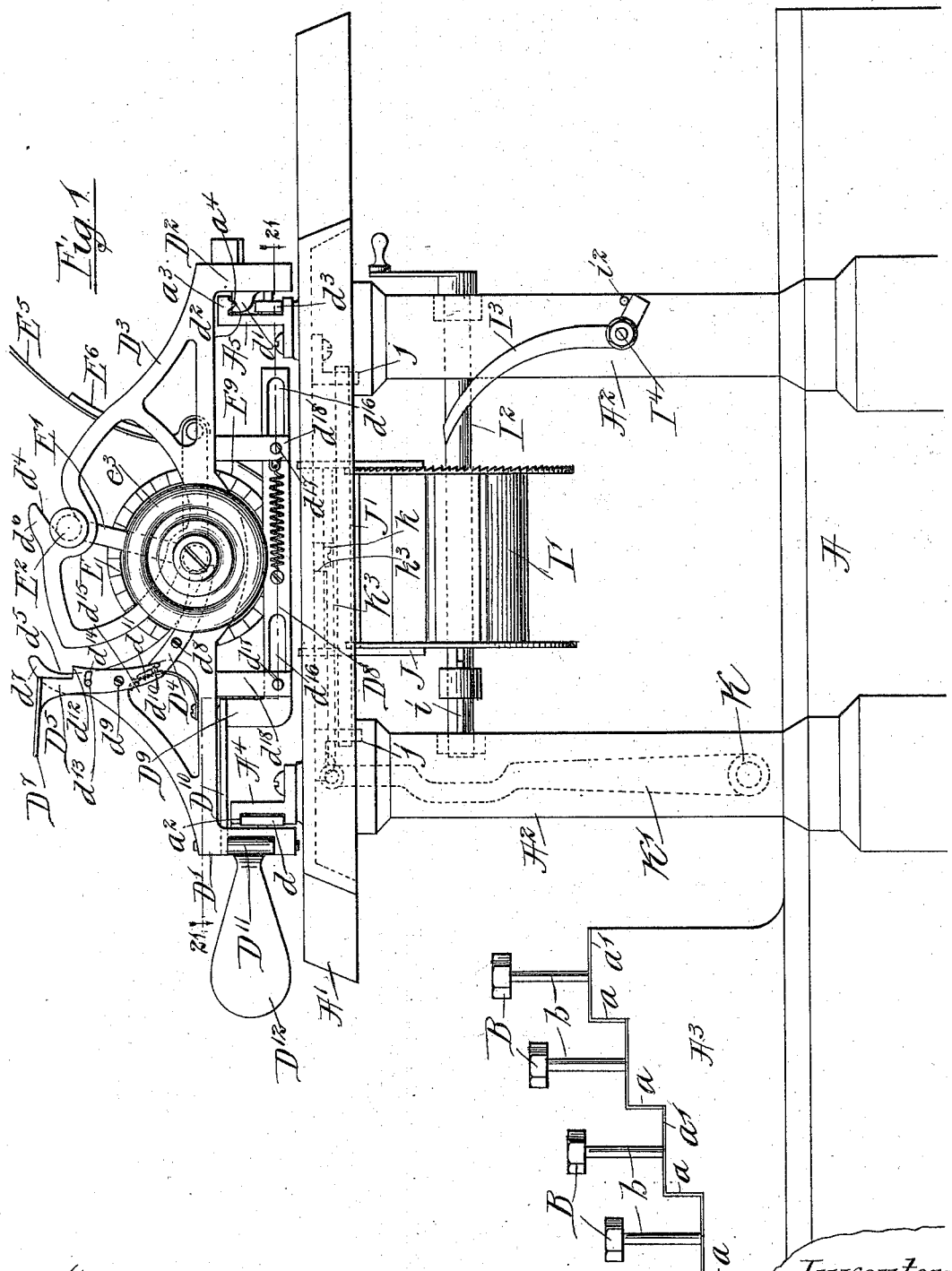

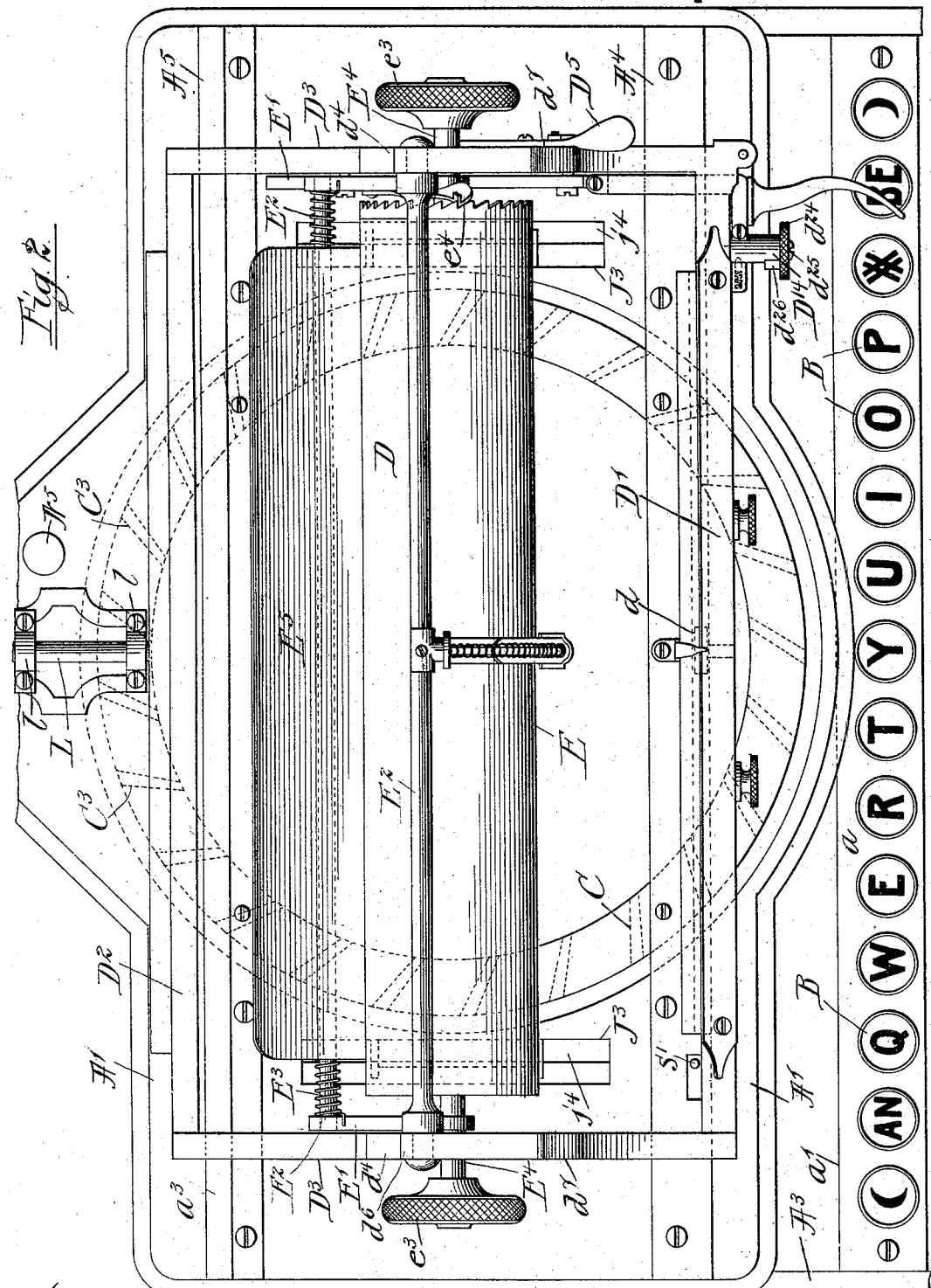

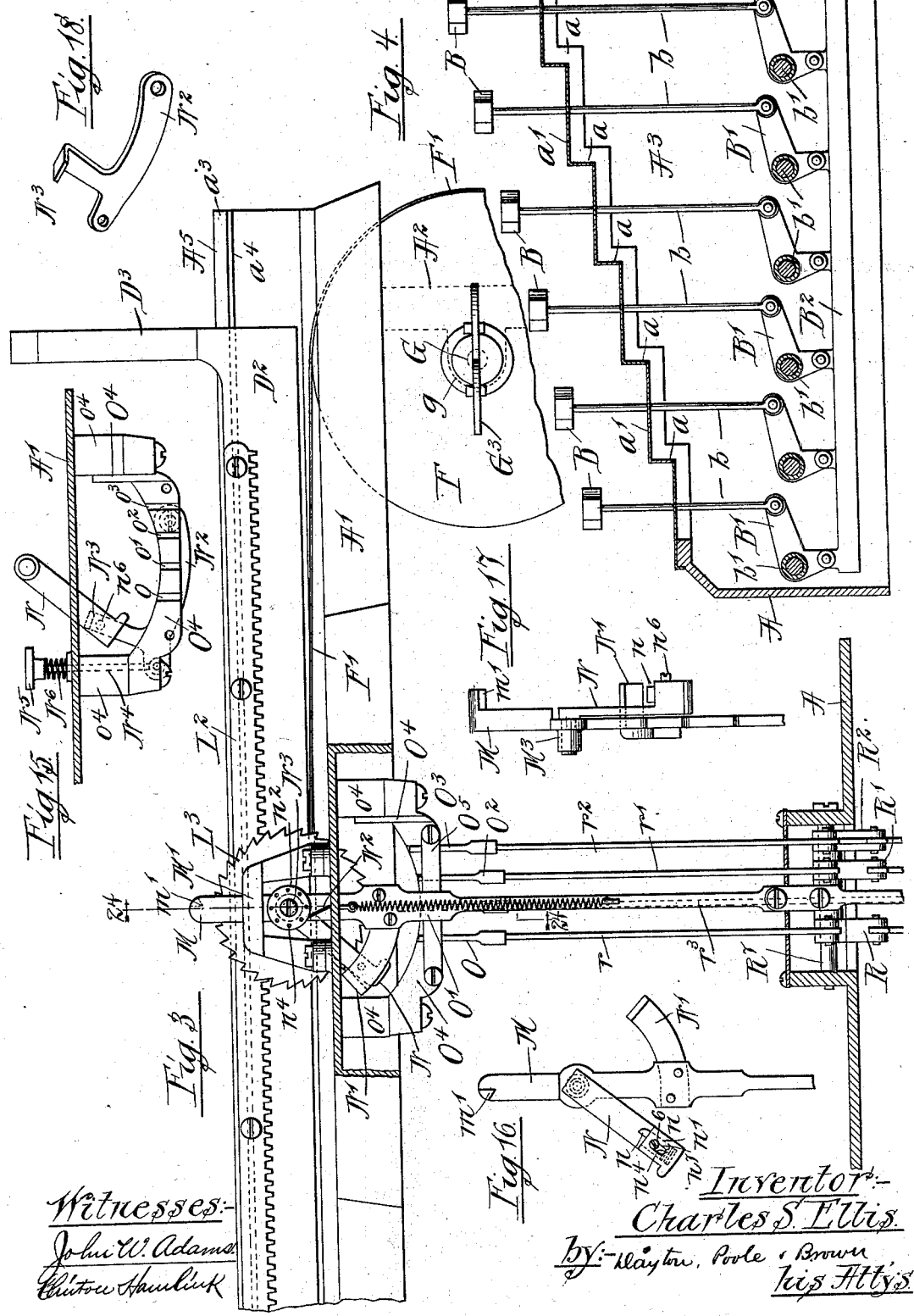

(No Model.) 9 Sheets—Sheet 4.

C. S. ELLIS.
TYPE WRITING MACHINE.

No. 559,128. Patented Apr. 28, 1896.

Witnesses:—
John W. Adams
Clinton Hamlink

Inventor:— Charles S. Ellis
by:— Dayton, Poole + Brown his Att'ys

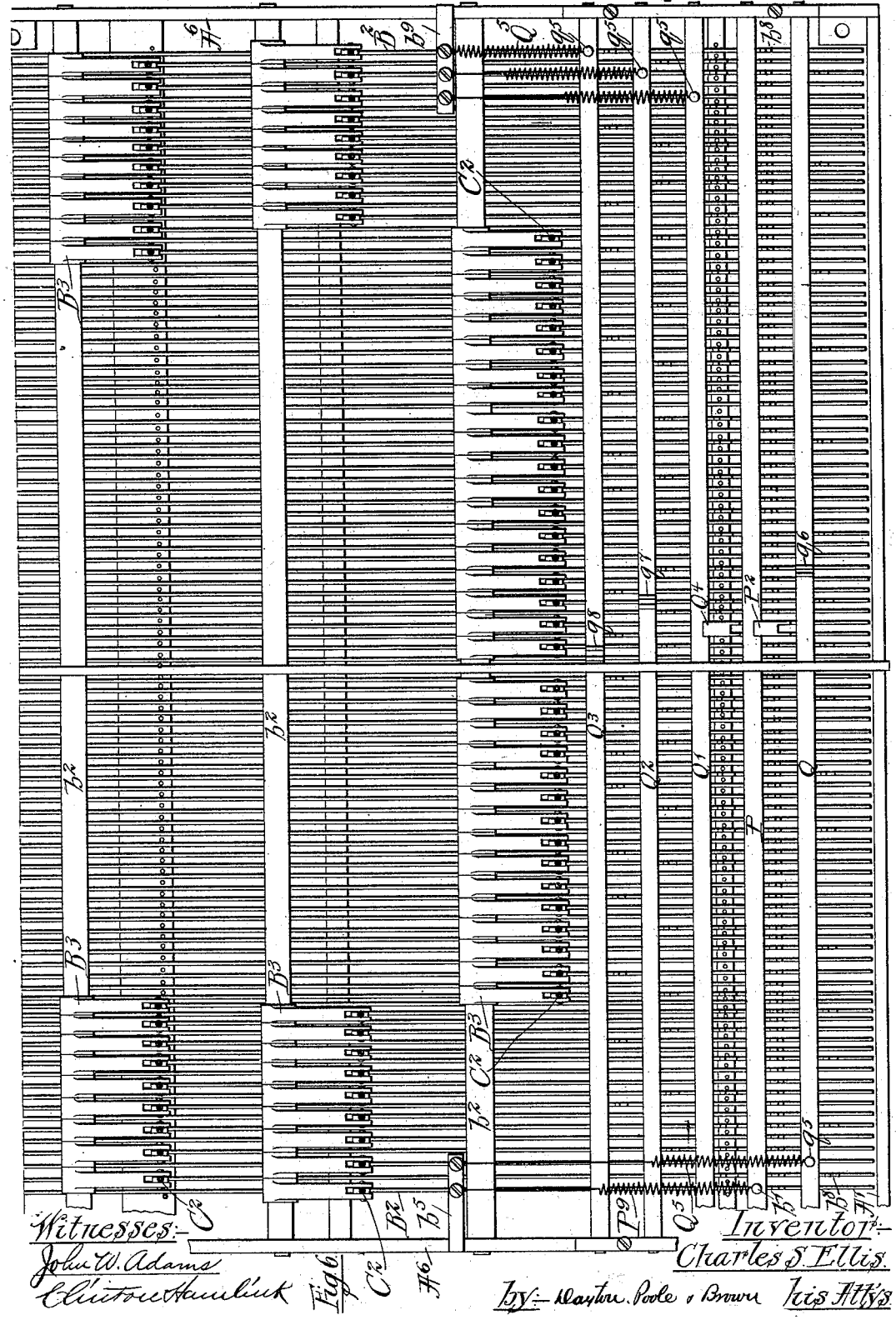

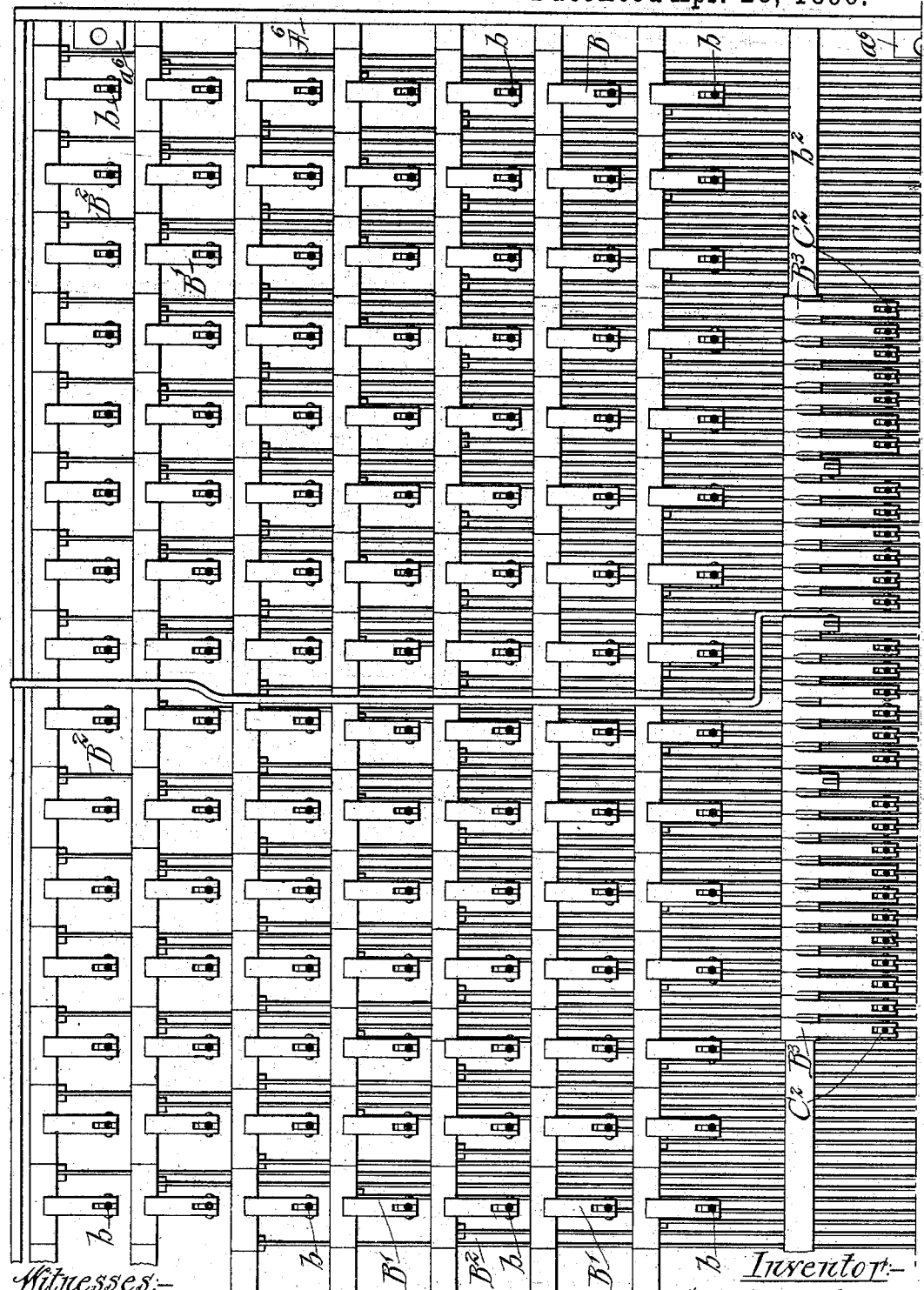

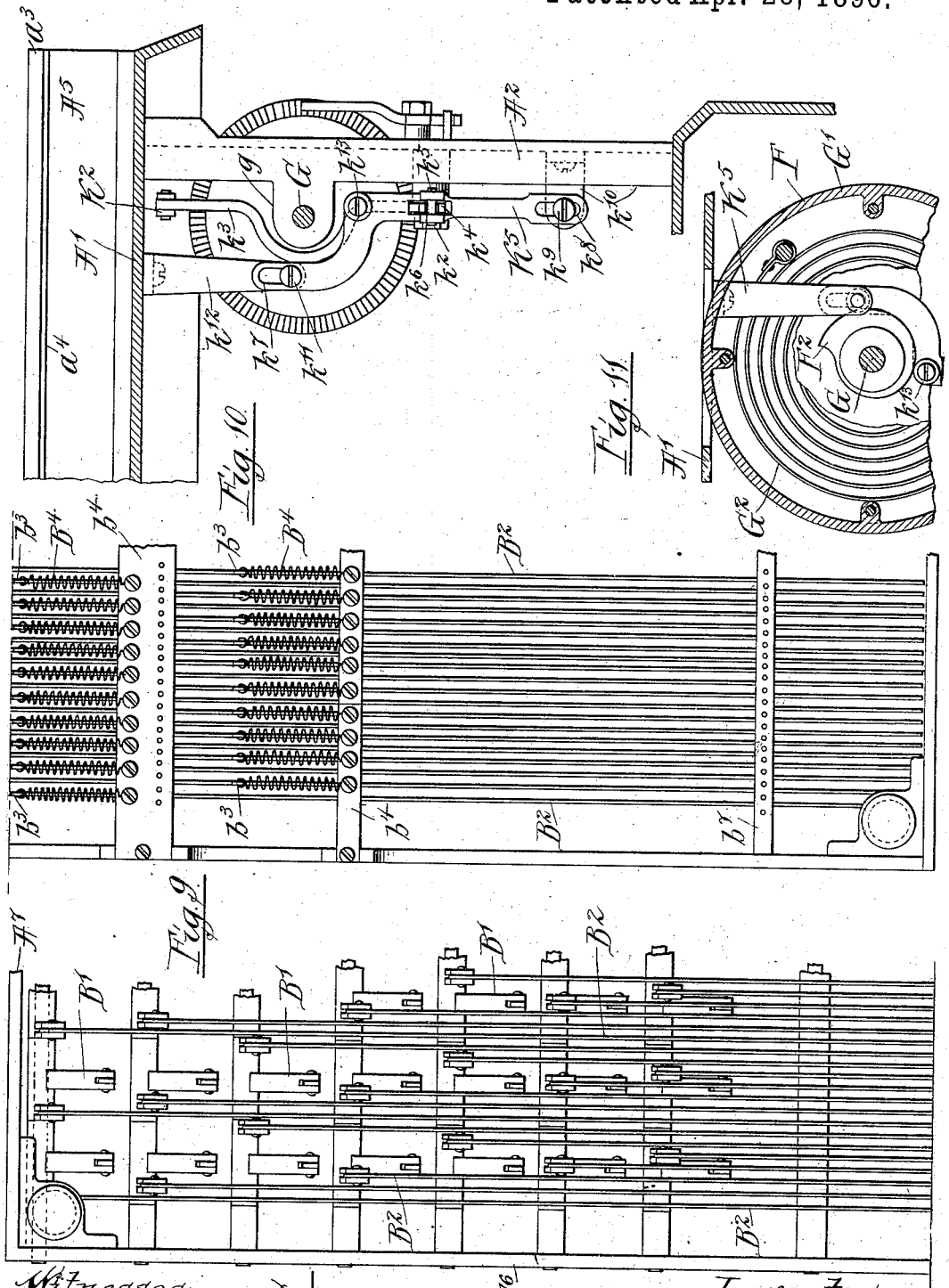

(No Model.) 9 Sheets—Sheet 8.
C. S. ELLIS.
TYPE WRITING MACHINE.
No. 559,128. Patented Apr. 28, 1896.
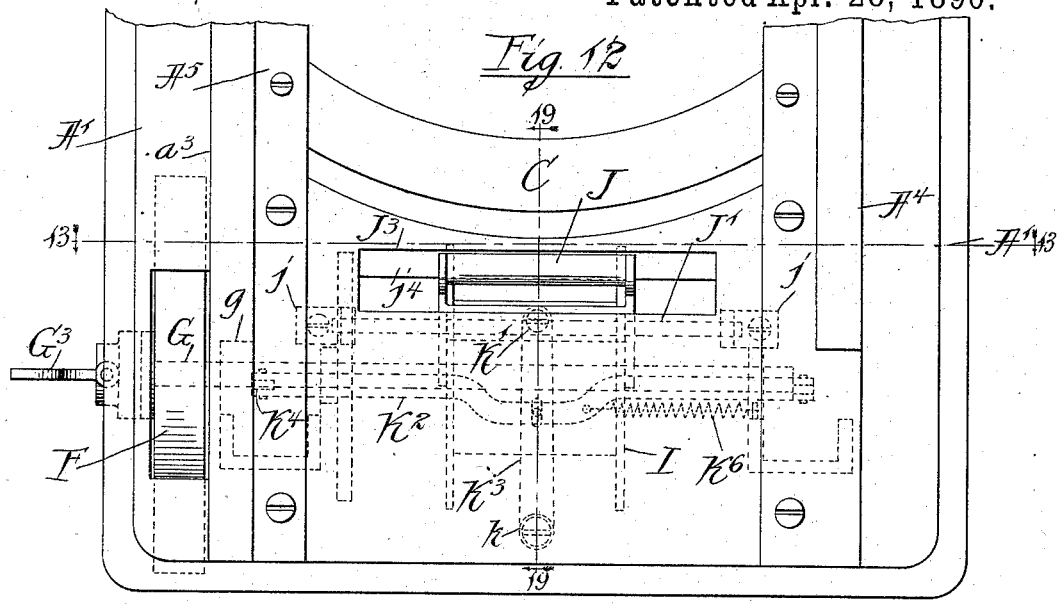
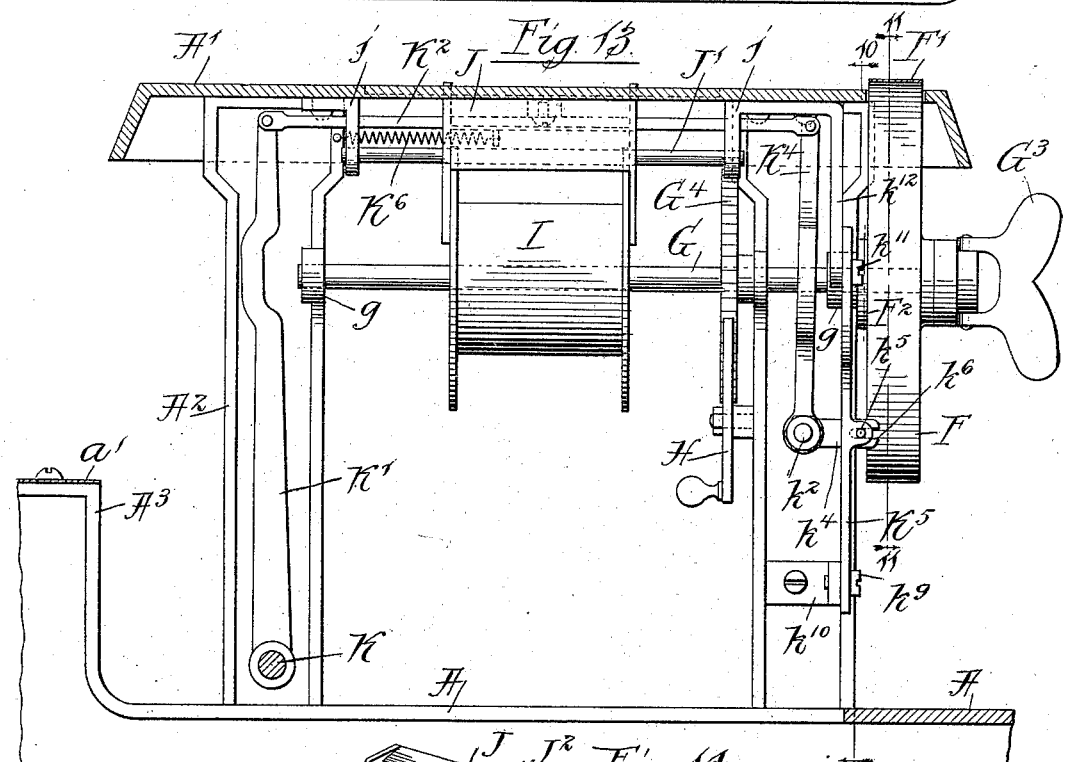
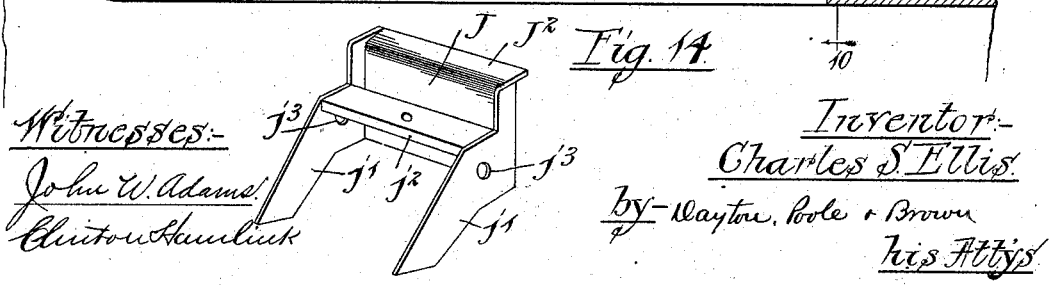
Witnesses:—
John W. Adams
Clinton Hamlink
Inventor:—
Charles S Ellis
by Dayton, Poole + Brown
his Att'ys
ANDREW B. GRAHAM, PHOTO-LITHO. WASHINGTON, D.C.

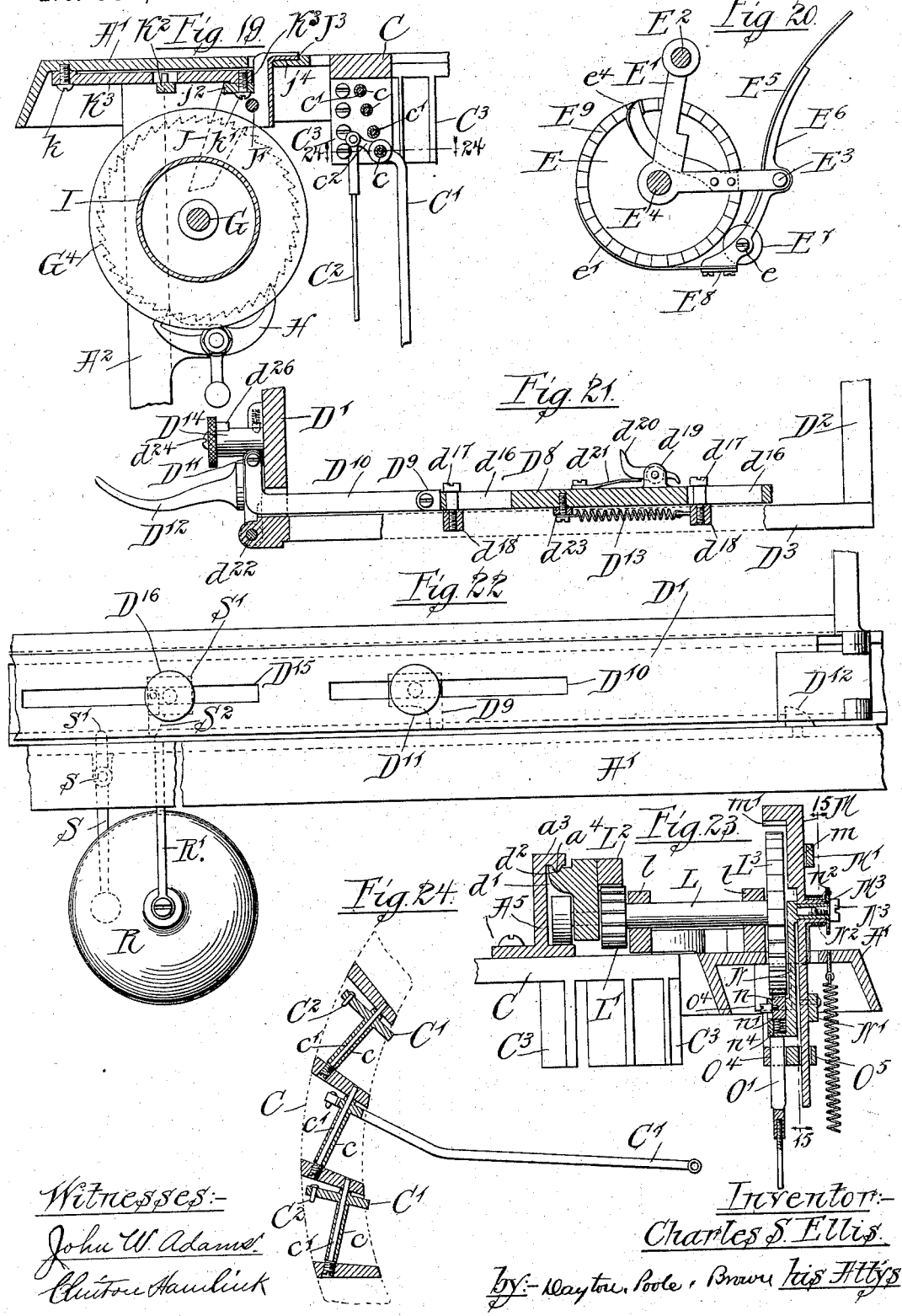

UNITED STATES PATENT OFFICE.

CHARLES S. ELLIS, OF CHICAGO, ILLINOIS, ASSIGNOR TO THE ELLIS-SOUTHWICK COMPANY, OF SAME PLACE.

TYPE-WRITING MACHINE.

SPECIFICATION forming part of Letters Patent No. 559,128, dated April 28, 1896.

Application filed July 8, 1895. Serial No. 555,214. (No model.)

*To all whom it may concern:*

Be it known that I, CHARLES S. ELLIS, of Chicago, in the county of Cook and State of Illinois, have invented certain new and useful Improvements in Type-Writing Machines; and I do hereby declare that the following is a full, clear, and exact description thereof, reference being had to the accompanying drawings, and to the letters of reference marked thereon, which form a part of this specification.

This invention relates to improvements in type-writing machines of that class in which the types are carried on pivoted type-bars, and which are commonly known as "type-bar" or "basket" machines.

The machine herein shown as embodying my invention is of that type in which a separate key is provided for each character that the machine is designed to print, including both the upper and lower case letters. It will be understood, however, that the improvements herein claimed are most of them applicable also to the shifting-carriage machines or those in which the platen and its carriage are moved bodily by means of a special key when it is desired to print the upper-case letters and certain of the punctuation-marks.

The machine illustrated contains improvements in the paper-feeding mechanism embracing variable-spacing devices by which the feed of the paper is made to correspond with the width of the type, and features of novelty in other parts of the machine, as will be hereinafter fully described.

The invention will be more readily understood by reference to the accompanying drawings, in which—

Figure 1 is a view in side elevation of a type-writing machine embodying my invention. Fig. 2 is a top plan view thereof. Fig. 3 is a view in rear elevation of the parts at the rear of the machine. Fig. 4 is a cross-sectional view of the lower front portion of the machine, showing the key mechanism; Fig. 5, the sectional elevation taken centrally through the basket, illustrating the arrangement of the type-bars. Fig. 6 is a plan view of the lower part of the machine as seen from beneath. Fig. 7 is a sectional plan view taken on a plane above the actuating bars and levers. Fig. 8 is a detail plan view from beneath of the parts adjacent to the rear end of the machine. Fig. 9 is a similar view of the parts of the front end of the machine. Fig. 10 is a detail sectional view taken on line 10 10 of Fig. 13, showing the mechanism for actuating the ribbon-spools. Fig. 11 is a fragmentary detail section showing the carriage spring-drum and the cam thereon. Fig. 12 is a plan view of one end of the top plate, showing the ribbon-shifting devices. Fig. 13 is a sectional elevation of the parts shown in Fig. 12, taken on line 13 13 of said Fig. 12. Fig. 14 is a perspective view of one of the slides which move the ribbon-spools. Fig. 15 is a detail section taken on line 15 15 of Fig. 23 and showing the yoke for the movable stops of the feed device. Fig. 16 is a face view of the detent-bar forming part of the spacing mechanism. Fig. 17 is a side elevation of the same. Fig. 18 is a perspective view of the releasing-dog for the spring-pawl of the spacing device. Fig. 19 is a vertical section taken through the top plate at one end of the machine, showing part of the inking-ribbon-actuating devices and also the pivots of the type-bars. Fig. 20 is an end view of the platen-frame. Fig. 21 is a view in horizontal section of the platen-turning devices. Fig. 22 is a detail face view of the front bar of the paper-carriage, showing the carriage-stop and alarm-bell actuating devices. Fig. 23 is a section taken on line 23 23 of Fig. 3. Fig. 24 is a horizontal section through the type-bar pivots.

As shown in said drawings, A designates the base of the machine, which is preferably made of cast metal and of rectangular form, and A' is a top plate, which is connected with the base by columns or standards $A^2$, made integral with said base, and to the upper ends of which the top plate is secured by screws or otherwise.

B B designate the keys, which are arranged in transverse rows or banks and placed one above and at the rear of the other at the front of the machine. They are secured to the upper ends of vertical stems $b$, which extend through suitable guide-apertures in a transverse plate $A^3$, which latter is supported at its ends on suitably-elevated parts of the base A and is formed with a plurality of steps $a$ $a$, one for each horizontal row or bank of keys. A sheet-metal plate $a'$, bent to conform to the several steps $a$, and enameled or otherwise finished, is in this instance placed over the plate $A^3$ to afford an appropriate finish to the machine. At their lower ends the key-stems $b$ are severally secured to the horizontal arms of bell-crank levers $B'$, Fig. 4, which are mounted to oscillate on rods $b'$, which are supported at their ends upon the side plates of the frame-base. The vertical arms of the bell-crank levers are pivotally attached to the forward end of horizontally-arranged key-actuating bars $B^2$, which extend from front to the rear of the machine within the base and near the bottom thereof.

Referring now to the construction of the basket of the machine, C indicates its upper marginal ring, which is supported within the usual circular aperture in the top plate of the machine.

$C'$ indicates a plurality of type-bars which are pivotally mounted in circular order in said ring, and $C^2$ indicates a corresponding series or depending links which are operatively connected at their upper ends with the said type-bars.

The lower ends of the links $C^2$ are pivotally secured to the horizontal arms of the bell-crank levers $C^3$, Fig. 5, which levers are mounted to oscillate upon transverse rods extending horizontally between the side pieces of the frame-base. The depending arms of said bell-crank levers are pivotally secured to the longitudinal bar $B^2$ at points between the ends thereof. These several parts are so arranged that when the keys B are depressed said bars will be drawn forward by the bell-crank levers $B'$ and will operate through the bell-crank levers $C^3$ to draw down the links $C^2$ and thereby the type-bars $C'$. The spiral springs $B^4$, Figs. 5 and 9, serve to return the bars $B^2$ and connected parts to their normal positions after they have been moved by pressure on the keys, said springs being placed below the bars with their front ends attached to the depending lugs $b^3$ thereof and with their rear ends attached to stationary transverse bars $b^4$, supported on the side of the base, Fig. 9. Being of a diameter considerably greater than the width of the bars $B^2$ the springs $B^4$, in order not to interfere with each other, are arranged in two separate rows, one behind the other, the springs of the two rows being connected to alternate bars $B^2$. As shown, in this instance the bell-crank levers $B'$ and $B^3$ are attached to short hubs, which are apertured for the passage of the pivot-rods, the levers being placed on said rods side by side with the hubs in contact, in order to hold them from shifting endwise on said rods. The longitudinal bars $B^2$ are in this instance made of flat strips of metal, preferably cut or stamped from sheet metal and provided at their upper edges with integral lugs $b^5$, to which the depending arms of the bell-crank levers are pivoted by means of suitable pivot pins or studs.

In order to simplify the construction of the parts, the bell-crank levers $B^3$ are distributed in groups upon a comparatively small number (in this instance four) of pivot-rods $b^2$, and the lower portions of the connecting-links $C^2$ are bent or offset backward or forward to the extent necessary to effect their proper connection with the upper ends of said bell-crank levers. With the four pivot-rods illustrated the bell-crank levers are distributed in six groups arranged at the middle portions of the front and rear rods and at the end portions of the intermediate rods, Figs. 6 and 7; but with a greater or less number of pivot-rods other convenient arrangements of the bell-crank levers may be employed which does not involve an excessive lateral deflection of the lower ends of the links. The said bars are separated or held in their upright position and parallel with each other by means of guide-pins $b^6$ $b^6$, inserted one set in the forward cross-bar $b^4$ and another set in another cross-bar $b^7$, located near the rear of the machine, said pins rising from said cross-bars between the actuating-bars, Figs. 5 and 6.

Referring more particularly to the construction of the basket-ring C, said ring is provided on its under surface with depending integral brackets $C^3$, having the form of flat vertical plates or flanges, which stand at a considerable angle with reference to radial lines of the ring. The type-bars $C'$ are pivotally supported between adjacent brackets in groups, the machine shown in the drawings containing four in each group. Each type-bar is provided with a rigidly-attached rock-shaft $c$, which is made of exactly the proper length for insertion between the depending brackets. Said rock-shafts are hollow or tubular, and pivotal supports for the type-bars are furnished by means of pivot-pins or pintles $c'$, which are inserted through the hollow rock-shaft and through suitably-located holes or apertures in the said brackets, Fig. 24. The pintles $c'$ are preferably screw-threaded at one end to enter the screw-threaded aperture in the bracket, the screw-threads being formed on enlarged parts or heads slotted to enable them to be easily inserted and removed.

The rock-shafts of the type-bars are not placed tangentially with reference to the circle of the basket, but are arranged nearly at right-angles to the brackets $C^3$, each of the type-bars being bent so as to strike the center of the basket, notwithstanding said angular arrangement of the pintles.

As herein shown, the bearing-apertures at one end of the rock-shafts are arranged in a vertical row adjacent to the outer edge of the bracket which they engage, while the apertures at the opposite ends of the rock-shaft are arranged in an upwardly and outwardly inclined row, the lowermost apertures being located adjacent to the inner edge of its bracket, while the uppermost aperture is located nearer the upper edge of the bracket. The type-bar the pintle of which is placed lowermost in each vertical row is located on said pintle immediately adjacent to one of the brackets, while the type-bar on the uppermost rock-shaft is located at the opposite end of the same adjacent to the next bracket, while the type-bars on the intermediate rock-shafts are arranged thereon at intermediate points in a uniform manner.

The outer or type ends of the several type-bars of each group are made of different lengths, as indicated in Fig. 5, according to the vertical position of their pivot-pintles, the length of the bars being in all cases such as to bring the type accurately in contact with the platen at the center of the basket when the body of the type-bar is thrown into its horizontal position, so that the proper impression will be obtained at whatever level the type-bar is pivoted. At their outer ends the type-bars are formed with short arms $c^2$, which are pivotally connected with the upper ends of the connecting-links $C^2$. Each of said connecting-links $C^2$ is provided with a turnbuckle $c^3$, by means of which its length may be adjusted to give the exact amount of throw in the type-bars that may be required. The usual padded ring $C^5$ is located near the bottom of the basket in position to arrest the type-bars as they fall back after being actuated. Said ring $C^5$ is herein shown as supported by means of depending arms $c^4$ from the ring C.

D designates as a whole a transversely-sliding carriage, which is mounted at the top of the machine and supports a cylindrical platen E, as herein shown. The frame of said carriage consists of parallel front and rear bars $D' D^2$, which are attached at their ends to the rigid side plates $D^3$. The carriage is mounted to slide upon transverse ways $A^4$, which are located over the top plate within the front and rear frame-bars of the carriage and are secured to said top plate by screws passing through the lower horizontal flanges of the ways, as illustrated. In the particular construction illustrated the basket-ring C is supported within the opening of the top plate by attachment to the under surface of said ways, thereby rendering unnecessary any special supporting device for the said ring. The outer or front face of the forward way $A^4$ is provided with a longitudinal groove $a^2$, which is engaged by an antifriction-wheel $d$, located on the rear or inner face of the front carriage-bar $D'$. The roller $d$ normally rests and runs upon the bottom of the groove $a^2$; but its diameter is practically equal to the width of the groove, so that it also prevents the front of the carriage from being elevated. The rear way $A^5$ is provided at its upper edge with a rearward-projecting flange $a^3$, having a depending rib $a^4$, which engages a correspondingly-shaped groove $d^2$, formed in an inwardly-projecting flange $d'$ on the rear frame-bar $D^2$ of the carriage. The said rear frame-bar $D^2$ is also provided with antifriction-rollers $d^3 d^3$, which rest and roll on a rearwardly-projecting part of the base-flange of the rear way $A^5$. The engagement between the rib $a^4$ and grooved flange $d'$ maintains the carriage in exact alinement with the ways and prevents its being lifted from the same at its rear edge.

The cylindrical platen E is herein shown as journaled within a rigid framework, comprising L-shaped end pieces E', Fig. 20, and transverse rods $E^2$ and $E^3$, which rigidly connect the outer or free ends of the L-shaped pieces, the angle of said end pieces being provided with bearing-apertures for the ends of the shaft $E^4$ of the platen. The transverse bar $E^3$, which connects the lower extremities of the end pieces, serves to pivotally support the usual sheet-metal paper-guide $E^5$, which is provided at its end with curved metal bars $E^6$, having apertured hubs, through which the rod $E^3$ passes. The bars $E^6$ project at their lower ends below the guide-plate $E^5$, and there support a relatively small guide-roller $E^7$, located just below the guide-plate $E^5$, and herein shown as journaled upon pivot-pins $e$, which pass through the bars $E^6$ and have adjustable screw-threaded engagement therewith.

Below the roller $E^7$ a narrow transverse guide-strip $E^8$ is secured to the ends of the bars $E^6$, said strip being located immediately below and in front of the roller $E^7$, Fig. 20, with its forward edge adjacent to the surface of the platen. Said guide-strip will preferably be graduated to form a scale. Spring guide-strips $e'$ are also secured to the ends of the arms $E^6$, said guide-strips being conveniently inserted between the arms and the ends of the guide-strip $E^8$, said strips $e'$ extending forwardly a considerable distance around the periphery of the platen, being bent to conform to the curvature of the same. Said spring-strips $e'$ are made of sufficient width to slightly overlap the ends of the roller $E^7$ and serve to support the edges of the paper when the same is passed beyond the roller $E^7$ and the guide-strip $E^8$. Coil-springs $E^2$, Fig. 2, located on the ends of the rod $E^3$, between the end pieces E' and the bars $E^6$, and attached at its opposite ends to said side pieces and bars, tend to swing the lower ends of the bars $E^6$ toward the platen and to thereby hold the roller $E^7$ yieldingly in contact with the same.

The platen-supporting framework thus constructed is herein shown as pivotally and detachably mounted in the carriage D, as follows: The end pieces E' of said frame are adapted for insertion between the frame-plates $D^3$ of the carriage and the ends of the uppermost rod $E^2$, projecting outside of said end pieces to form journal-bearings, which are adapted to rest in open slots $d^4$, located in the upper edges of the frame-plates $D^3$ of the carriage at points slightly to the rearward of the center line of the machine. The ends of the platen-shaft $E^4$ also project past the end pieces $E'$, and are adapted for engagement with open-ended arc-shaped slots $d^5$, which are formed in the frame-plates $D^3$ and arranged concentrically with the lower or bearing ends of the slots $d^4$. Said slots $d^5$ terminate at their lower ends at points in a vertical plane, passing through the center of the basket, so that when the ends of the platen-shaft rest therein the platen will be supported centrally over the basket. As herein shown, the forward or outer sides of the slots $d^4$ are made somewhat longer than their rear or inner sides, thereby forming upwardly-projecting prongs $d^7$ in front of the slots, against which the rod $E^2$ will strike when slid forward upon the top of the frame-plates, at which time they will be guided into the said slots $d^4$. The open upper ends of the slots $d^5$ are similarly provided with upwardly and rearwardly directed prongs $d^7$, acting as guides for the ends of the platen-shaft $E^4$. In this construction, in order to place the platen on the carriage, the ends of the rod $E^2$ and shaft $E^4$ are placed upon the upper surface of the frame-plates $D^3$, and are slid forward thereon until they strike the prongs $d^6$ $d^7$, when they will be at once guided into the slots in which they respectively belong. The shaft $E^4$ is herein shown as extending at its ends considerably beyond the frame-plates $D^3$, and is provided at its ends with wheels or disks $e^3$, by which the platen may be conveniently turned or manipulated.

The platen is held in its position above the center of the basket C by a holding device located on the carriage and adapted to engage the ends of the platen-shaft in such manner as to maintain the same within the lower ends of the slots $d^5$. Such holding device, which is also adapted to maintain the platen in its elevated position by engaging the platen-shaft when the same is at the upper ends of said slots, is constructed as follows: $D^4$ indicates a detent-lever, which is pivotally secured between its ends to the frame-plate $D^3$ outside of the slot $d^5$ and near the lower end thereof by a pivot-screw $d^8$. The rear end of said detent is arranged to engage the front side of the platen-shaft when the latter occupies the lower end of the slot $d^5$; but the detent may be swung on its pivot so that its lower end will drop beneath the lower part of its slot $e^5$ and thus relieve the platen-shaft. $D^5$ is a second detent-lever, which is secured to the frame-plate $D^3$ by a pivot-screw $d^9$, said lever being located opposite the upper portion of the slot $d^5$. The lower end of the detent $d^5$ overlaps the forward or upper end of the detent-lever $D^4$, and the overlapping ends of the levers are connected so that the lever will move simultaneously by means of a pin $d^{10}$ in one part engaging a slot $d^{11}$ in the other part. Near its upper end the detent-lever $D^5$ is provided with an upwardly-facing shoulder $d^{12}$, which projects part way across the slot $d^5$ at the time the rear end of the detent-lever $d^4$ is shifted or stands opposite the slot. Oscillatory movement of the two levers $D^4 D^5$ is limited by a stop-pin $d^{13}$, which is secured in the frame-plate and engages a short segmental slot $d^{14}$ in the detent-lever $D^5$. A leaf-spring $D^6$ is secured to the carriage-frame and exerts a constant pressure on the lower end of the detent-lever $D^5$ in such manner as to throw the ends of such levers across the slot $d^5$ and into position to engage the platen-shaft. Said spring $D^6$, as herein shown, is made of curved or C form and is secured at its lower end to the lower horizontal bar of the frame-plate $D^3$ and is hooked at its upper end over an outwardly-projecting pin or stud $d^{15}$ in the detent-lever $D^5$. A finger-piece $D^7$ at the upper end of the detent-lever $D^5$ enables the two detent-levers to be rapidly swung clear of the slot $d^5$ against the pressure of said spring $D^6$.

In placing the platen on the carriage the detent-levers described are drawn back far enough to permit the platen-shaft to pass the shoulder $d^{12}$. After passing said shoulder the shaft may drop freely to the lower ends of the slots, where the shaft will be engaged by the rear end of the lower detent-lever, and in raising the platen the detents are withdrawn far enough to release the platen-shaft, and the latter is then swung upwardly to a point beyond the shoulder $d^{12}$, which latter will be thrown by the action of the spring beneath said shaft and will hold the platen in its elevated position until the detents are again withdrawn.

It will of course be understood that the swinging movement of the platen described is to enable said platen and the paper held thereon to be swung upwardly and forwardly, so as to bring the line being printed into position for inspection by the operator.

The platen E is provided at one end with a rigidly-secured ratchet-flange $E^9$, through the medium of which the necessary rotation of said platen required to move the paper along from line to line is effected. To hold the platen against rotation while the printing is being accomplished, said ratchet-flange is constantly engaged by a detent-spring $e^4$, which is secured to one of the end pieces $E'$ and engages said ratchet at its free end. For giving rotary motion to the platen, devices are provided as follows:

$D^8$ indicates a reciprocatory horizontal bar, located at the lower edge of the frame-plate $D^3$ adjacent to the rigid frame $E^9$. Said bar in this instance is provided at its front and rear ends with slots $d^{16}$, through which are loosely inserted guiding and supporting studs $d^{17}$, which are secured in arms $d^{18}$ depending from the frame-plate $D^3$. Between its ends the bar is provided with inwardly-projecting lugs $d^{19}$, between which is pivotally mounted a pawl $d^{20}$, adapted for engagement with ratchet-flange of the platen. A spring $d^{21}$ is applied to act on the pawl, so as to throw it into contact with the ratchet. At its forward ends the bar $D^8$ is provided with an upwardly-projecting part $D^9$, which is pivotally connected by means of a link $D^{10}$ with a swinging lever $D^{11}$. Said lever $D^{11}$ is arranged parallel to the front bar of the carriage and is pivoted at one end by means of a vertical pivot-pin $d^{22}$ to the carriage, and its opposite end is connected with the link $D^{10}$. Said lever $D^{11}$ is pivoted to the carriage at its end, which is at the right hand when facing the machine, and the lever is provided on its outer face with a projecting finger-piece or handle $D^{12}$, which stands outwardly at right angles thereto and projects at the front of the frame toward the operator, so that when pressure is applied to said finger-piece in a direction to move the carriage back to its starting-point or toward the right the lever will be swung on its pivot and the bar $D^8$ will be drawn outwardly. Said bar is held in its backward retracted position by a coiled spring $D^{13}$, attached to a stud $d^{23}$ on the bar and to one of the depending arms $d^{18}$. The link $D^{10}$ is shown as bent at right angles near its outer end, so as to reach the lever $D^{11}$, which is not arranged in exact alinement with the bar $D^8$. When it is desired to rotate the platen, the lever $D^{11}$ is swung on its pivot by means of the handle $D^{12}$, and the reciprocatory bar is thereby thrown forward against the action of the retracting spring $D^{13}$, and in the movement of said bar the pawl $d^{20}$ will act on the adjacent teeth of the ratchet-flange $E^9$ and thus impart a rotary motion to the platen, the extent of which will depend upon the extent to which the bar $D^8$ is moved.

$D^{14}$ designates a rotary sleeve, which is provided with an enlarged milled head $d^{24}$, and is revolubly secured by means of a pivot stud or screw $d^{25}$ to the face of the front carriage-bar $D'$, adjacent to the free end of the lever $D^{11}$. The head of the sleeve is adapted to project into the path of the free end of the lever $D^{11}$ and forms a positive stop by which the outward movement of the lever is limited. Said sleeve is also provided about midway of its length with a stop pin or shoulder $d^{26}$, which, by the turning of the sleeve, may also be brought into the path of the lever $D^{11}$ and will then restrict the movement of the latter to about half the distance permitted by the milled head. Ordinarily the parts will be so proportioned that the movement of the lever $D^{11}$ before striking the milled head of the sleeve will be sufficient to rotate the platen to the extent of two teeth of the ratchet, while the movement permitted by the stop $d^{26}$ will only be sufficient to rotate the platen to the extent of one tooth of the ratchet. It follows that by turning the sleeve so as to throw the stop $d^{26}$ into or out of the path of the lever $D^{11}$ a single or double space may be secured between the lines, as desired. A spring-actuated pin $d^{27}$ is arranged to engage either one of two recesses in the sleeve $D^{14}$ to hold the sleeve from being accidentally turned, the said pin having a rounded end to engage the sleeve, so that it will slip out of the recesses when some force is applied to turn the sleeve.

The carriage is maintained under a constant tension, tending to draw it across the machine from right to left by a drum F, which is turned by the carriage-actuating spring. Said drum is located at the left-hand side of the machine-frame in the same vertical plane with the rear bar of the carriage-frame, and is connected with said bar by means of a flexible strap $F'$, which is attached at one end to the periphery of the drum and its opposite end to said bar. Said drum is revolubly mounted in the usual manner upon a horizontal shaft G, journaled in suitable bearings $g$ on the inner faces of the frame-standards. The shaft is provided with the usual rigidly-attached spring-barrel $G'$, which extends into the drum F and to which the inner end of the coil-spring $G^2$, Fig. 11, is secured in a familiar manner. A suitable key or handle $G^3$ on the end of the spring-barrel enables the shaft G to be turned to give any required degree of tension to the spring. The shaft is adjusted to hold against rotation under the tension of the spring by means of a rigidly-attached ratchet-wheel $G^4$, Fig. 19, which is controlled by an ordinary escapement-lever H, pivoted to the adjacent frame-standard in a familiar manner.

The usual inking-ribbon commonly employed in this type of machine is wound upon drums or spools I $I'$, which are revolubly mounted at opposite sides of the machine beneath the top plate. The drum I at the left-hand side of the machine is herein shown as loosely mounted upon the shaft G, and is adapted to slide longitudinally upon the same. The drum $I'$ at the opposite side of the machine is mounted upon a horizontal shaft $I^2$, journaled in bearings secured to the standards at the right-hand side of the machine, said drum being arranged to engage a feather $i$ on said shaft $I^2$, so as to be held from rotation on the shaft.

J J are sliding frames mounted on guide-rods $J'$, which are arranged beneath the top plate above and parallel with the shafts G and $I^2$. Said guide-rods $J'$ are supported by depending brackets $j$ from said top plate. The guide-frames J, as more clearly seen in Fig. 14, consist of side plates $j' j'$, which are connected by cross-bars $j^2$, and are provided with bearing-apertures $j^3 j^3$, which engage the guide-rods $J'$. Said side plates $j' j'$ are also connected by means of L-shaped guide-plates $J^2$, which serve as guides for the ribbon, the upper ends of said plates extending through transverse slots or openings $J^3$ in the top plate of the machine and resting on horizontal guide-surfaces $j^4$, which are formed at the inner sides of said slots or openings in the manner illustrated, Figs. 12 and 2. Said side plates $j'$ $j'$ are also extended downwardly in the form of arms or prongs far enough to engage the outer end surfaces of the drums I I'.

Devices for giving simultaneous endwise movement to the drums, so as to shift the ribbon sidewise with reference to the type, are provided as follows: K is a transversely-arranged rock-shaft, which extends across the machine-frame near the base thereof and which is herein shown as mounted in bearings at the lower ends of the front standards of the machine. To the opposite ends of said shaft are secured upwardly-extending rigid arms K', to the upper free ends of which are rigidly attached horizontal sliding bars $K^2$ $K^2$, located in suitable guides beneath the top plate outside of sliding frames J'. At both sides of the machine the bars $K^2$ have pivotal connection with horizontally-oscillating levers $K^3$, which are arranged parallel with the front of the machine and are pivoted at their upper ends to the frame-plate by means of pivots $k$, and are connected at their inner or free ends with the sliding frames J' by means of pivot-studs $k'$, secured in the cross-bar $j^2$ of said frame, as clearly shown in Fig. 19. The bar $K^3$ at one end of the machine, Fig. 1, terminates at the lever $K^3$, but at the opposite end of the machine, Figs. 12 and 13, said bar extends across the machine and terminates at a point near the drum F, where it is connected with the vertical arm of a bell-crank lever $K^4$, which is pivoted by means of a small stud $k^2$ to the adjacent frame-standard, said pivoted frame being located considerably below the shaft G. The upright arm $k^3$ of said bell-crank lever is made of considerable length, but the horizontal arm $k^4$ thereof is much shorter and is engaged with a vertically-sliding bar $K^5$ by means of a pivot-pin $k^5$ on the said bar, which engages a slot $k^6$ in the said arm. Said bar $K^5$ is shown as mounted to slide vertically on the machine-frame through the medium of vertical slots $k^6$ $k^7$ in the lower and upper ends of the bar, the lower slide engaging a stud $k^9$, attached to a bracket $k^{10}$ on the adjacent frame-standard, while the upper slot $k^8$ engages a stud $k^{11}$, secured to a depending bracket $k^{12}$, which is attached to the under surface of the top plate. Said bar $K^5$ is bent or offset near its upper end to avoid the shaft G and the bearing $g$ thereon. Mounted on said bar K below the shaft G is a pin $k^{13}$, which is adapted for engagement with a cam $F^2$, attached to the drum F, which cam is constructed, by its action on the pin $k^{13}$, to give vertical movement to the bar $K^5$ in one direction, the said pin being held in contact with the cam by means of a suitably applied and located spring $K^6$. The cam $F^2$, acting on the bar $K^5$, as described, serves to move said bar vertically, and such vertical movement of the bar serves to give a longitudinal movement to the bar $K^2$, which is much greater in extent than the vertical movement of the bar $K^5$, owing to the difference in length between the two arms of the bell-crank lever $K^4$. The endwise motion of the bar $K^2$ is transmitted directly to the adjacent sliding frame J' by the lever $K^3$, and indirectly to the sliding frame at the opposite end of the machine through the medium of the rock-shaft K, the arms K' K' thereon, the bar $K^3$, and lever $K^4$.

By the construction described as the carriage moves to the left in the usual step-by-step manner when the keys are struck the drums I I' and slides J J', bearing the inking-ribbon, will be gradually moved forward and will carry the inking-ribbon with them, so that the latter will present a new surface to the action of each succeeding type.

To provide for giving rotary motion to the drum $l$, a pawl $l^3$ is mounted on the forward frame of the standard in position for contact with the adjacent end of the drum, and said drums are provided with ratchet-teeth to engage said pawl, the pawl being held in position for engagement with the drum by means of a stop-pin $i^2$, arranged adjacent to its pivot-stud $I^4$ in a familiar manner. As the drum approaches the forward limit of its movement the pawl, arranged as described, will give the drum a slight rotary movement by which the ribbon will be fed along a short distance, so that in the printing of the succeeding line an entirely new transverse section of the ribbon will be presented to the action of the type. In this manner the ribbon will be gradually unwound from the drum I' and wound upon the drum I by a succession of intermediate rotary impulses imparted to the drums at the end of the longitudinal reciprocation of the latter, so that when it has been fed along its entire length other portions of the ribbon will have been exposed to the action of the type. A crank-handle on the rear end of the shaft $I^2$ enables the ribbon to be wound upon the drum I' in the first instance and to be rewound upon the same after having been wound upon the drum I by the action of the machine in the manner stated.

$D^9$ indicates an adjustable stop for limiting the movement of the carriage toward the right-hand end of the machine, or, in other words, for determining the left-hand margin of the printed page. As herein shown, Fig. 22, said stop is mounted on the front frame-bar D' of the carriage, and it consists of a metal block having a flange which fits within an elongated slot $D^{10}$ in the said frame-bar D', a clamping-screw $D^{11}$ being inserted through the said slot and engaging the block to clamp it in any desired position on the frame-bar. At its right-hand end the said block is provided with a downwardly-projecting tooth, which is adapted to strike against a stop-shoulder $D^{12}$ on the top plate of the machine when the end of the platen reaches a point adjacent to the center of the basket. The exact position of the carriage at the limit of its movement will of course depend upon the position to which the stop is adjusted on the bar D', which position may obviously be varied as desired.

The mechanism herein shown for controlling the feed motion of the carriage is of that kind known as a "variable feed," the same being so constructed that as the carriage is advanced step by step to bring the paper into position for the successive action of the types on the paper it is moved through variable distances to correspond with the varying widths of the type-faces, it being understood that the types carried by the several bars may be of any desired width and may embrace any desired number of letters, since the invention contemplates a movement of the carriage by each key a distance corresponding with the space required by the type actuated by that key. Said spacing mechanism is shown more clearly in Figs. 3, 5, 15, 16, and 17, and is constructed as follows: L indicates a revolving shaft arranged horizontally at right angles with the path of the carriage at the rear thereof, said shaft being herein shown as journaled in bearings $k'$ $k'$, attached to the top plate of the machine, which plate is extended rearwardly in its part adjacent to the shaft to support said bearings. Said shaft L is provided with a gear-wheel or pinion L', which intermeshes with a rack $L^2$, secured to the rear bar $D^2$ of the carriage-frame, so that endwise movement of the carriage under pressure of its actuating-spring imparts a rotary motion to said shaft.

The rotation of the shaft L is controlled and the carriage is thereby arrested after movements through varying distances upon reaction of the several key-levers through the medium of devices constructed as follows: $L^3$ designates a ratchet-wheel which is rigidly secured to the rear end of the shaft L and which has its teeth so directed that those at its top present their abrupt faces toward the side of the machine toward which the carriage is moved by its actuating-spring. M is a vertically-arranged longitudinally-reciprocating bar which is located adjacent to the rear face of the ratchet-wheel. Said bar is supported or guided by means of a yoke M', attached to the top plates of the machine and provided with a horizontal bar elevated above the said top plate, which bar is provided with a central guide notch or recess $m$ in which the upper part of the bar M is held and slides. Said bar M is provided at its upper end with a detent projection or tooth $m'$, which is adapted to engage the teeth of the ratchet-wheel $L^3$ at the top of the same.

N is a swinging detent-arm which is pivoted to the inner face of the detent-bar M, so as to swing in a plane parallel with the ratchet-wheel. Said arm is provided at its lower end with a detent projection $n$, which extends beneath the ratchet-wheel and is provided with a spring-pawl $n'$, adapted for engagement with the ratchet-wheel teeth. The detent-arm N is adapted to swing through an arc at the lower part of the ratchet-wheel and, preferably, at either side of a vertical line passing through the center of the ratchet-wheel, and the pawl $n'$ is located at such distance vertically from the detent-tooth $m'$ that only one of said parts can be engaged with the ratchet at the same time, the parts being so constructed that when the detent-bar is depressed to bring its tooth $m'$ into engagement with the ratchet-wheel the pawl $n'$ will be released therefrom, and vice versa. Said arm N is actuated in one direction by means of a spring $N^2$, suitably applied between the same and the bar N'. In the particular construction illustrated, the spring referred to has the form of a coiled spring, which surrounds the pivot-stud $N^3$ of the arm N, said pivot-stud passing through the bar M and being provided at its outer end with a disk $n^2$, which is secured to the shaft and is provided with a series of circumferentially-arranged holes $n^4$, in either of which the end of the spring may be inserted to give a desired tension thereto. The bar M, as shown, Fig. 17, is provided with an integral sleeve or hub M', which forms a bearing for the stud $M^3$, and against the end of which the disk $n^2$ is adapted to bear, so as to hold the stud from endwise movement, said disk being fitted over the squared end of the stud and held thereon by a screw $N^3$, inserted in the end of the stud. The coiled spring $N^2$ in this construction surrounds the hub M' between the bar and the disk $n^2$.

The spring $N^2$ tends to turn the arm N in a direction opposite to that in which it is moved when its pawl $n^2$ is engaged with the ratchet-wheel, under the action of the carriage-actuating spring, and said spring $N^2$ is adapted to exert much less force or pressure on the arm N than is exerted thereon by the said carriage-actuating spring, so that said arm will be held by the action of said carriage-spring normally at the limit of its possible movement in the direction in which the ratchet-wheel turns in the advance of the carriage. The movement of said arm in the direction mentioned is limited by a stop, herein shown as formed by means of a bent bar N', attached to the bar N.

When the detent-arm is released from the ratchet-wheel by the lowering of the detent-bar M, its actuating-spring $N^2$ will throw said detent-arm in a reverse direction, or away from said stop, until its movement is arrested by striking an adjacent part of the machine-frame. The oscillatory movement of the arm N under the action of its actuating-spring $N^2$ is limited by a series of movable stops O, O', $O^2$, and $O^3$, located below the path of the free end of said arm and adapted to be thrown upwardly into the path of said arm, so as to limit the movement thereof at intermediate points in its path. The said stops O, O', $O^2$, and $O^3$ have the form of vertically-arranged sliding bars, which rest in vertical guide-passages $o$, $o'$, $o^2$, and $o^3$, formed in a guide bar or yoke $O^4$, which is located below the path of the detent-arm and is supported at its ends by attachment to depending lugs $o^4$ $o^4$, secured to the top plate of the machine.

An upwardly-projecting arm O⁵ at one end of the yoke O⁴ serves as a stationary end stop to limit the movement of said arm under the operation of its actuating-spring N² when all of the movable stops are withdrawn. The guide-passages $o$, $o'$, $o^2$, and $o^3$ are herein shown as formed by vertical grooves in the front face of the yoke O⁴, which grooves are covered and the bars confined therein by means of a front plate O⁵.

The several sliding bars O to O³ constitute stops which limit the forward movement of the detent-bar under the action of its actuating-spring, and when said stops are all of them withdrawn said bar is free to move through its greatest extent of movement, or until it strikes the end stop $o^5$. The stop-bars O to O³ are arranged at an angular distance apart, referring to the center of movement of the oscillating detent-bar, corresponding with the angular distance between the teeth of the ratchet-wheel. Similarly the end stop $o^5$ is located at an angular distance in advance of the stop-bar O³ equal to one ratchet-tooth. It follows that five units of movement, each equal to one ratchet-tooth, constitute in this instance the total possible radial movement of the detent-arm N from its place of rest. The several stop-bars O to O³ are severally given endwise movement for the purpose of presenting them in position to act as a stop for the detent-arm through the medium of the devices hereinafter described, which are actuated by the several type-actuating bars B² when the corresponding keys B are struck.

The pawl $m'$ is adapted to yield to permit the backward turning of the ratchet-wheel, so as to allow the backward turning of the shaft. This enables the carriage to be returned to its starting-point by the operator either when the end of a line is reached or at any time desired, the shaft L at such time merely turning backward as the carriage is moved, without affecting in any way the action of the feeding devices. The pawl $n'$ is herein shown as formed on the upper end of a sliding block, located in a guide-recess in the projections $n$ and held in operative position by a spring $n^4$, placed in said recess beneath it, the upward movement of the pawl being limited by a stud $n^6$, which passes outwardly through a slot $n^7$ in the arm in the manner illustrated in Figs. 16 and 17.

The bar M is given vertical reciprocatory movement through the medium of suitable connections with the keys, whereby each time any one of the keys is depressed said bar M will also be depressed, and when the key is allowed to rise the bar will be elevated. Devices for actuating the said bar M are herein shown as made as follows: P indicates a rock-shaft mounted transversely at the rear part of the machine-frame just above the several reciprocating bars B². Said rock-shaft is provided with a rigidly-attached depending leaf or blade P′, the lower free edge of which is located in close proximity to the several longitudinal bars B². Each one of said longitudinal bars is provided at its upper side with a stop pin or projection $b^8$, arranged for contact with the blade P′. A suitable spring P⁹ herein shown as a contractible coiled spring, is applied in such manner as to throw the free edge of the blade P′ into contact with the projections on the key-actuating bars. Said spring is shown, Figs. 5 and 6, as attached at one end to a rigid upwardly-projecting arm $b'$ on the rock-shaft and at its opposite end to a stationary arm or bar $b^5$ on the machine-frame. To the said rock-shaft is attached a rearwardly-projecting arm P², which is connected by means of an intermediate bar P³ with the bar M. A coiled spring P⁴, attached to the bar M below the top plate of the machine and also to said top plate, as seen in Fig. 3, serves to support the weight of said bar and aids in holding the blade of the rock-shaft in contact with the several projections $b^8$. It follows from this construction that when either of the keys are operated the detent-bar M will be moved.

Vertical movement is given to the several stop-bars by means of suitable connections between the latter and four transverse rock-shafts Q, Q′, Q², and Q³, which are mounted in the base of the frame parallel with the rock-shaft P. Each of said rock-shafts is provided with a depending blade $q$, $q'$, $q^2$, and $q^3$, the lower edges of which are located in close proximity to the longitudinal bars B² and engage projections $b^{10}$, $b^{11}$, $b^{12}$, and $b^{13}$ thereon. Suitably-arranged springs Q⁵ are applied to the several rock-shafts in such manner as to normally press the lower edges of the blades rearwardly against the front sides of the projections $b^{10}$, $b^{11}$, $b^{12}$, and $b^{13}$ on said bars B². The said springs Q⁵ are in this instance ordinary coiled tension springs, secured at their rear ends to upwardly-projecting rigid radial arms $q^5$ on the rock-shafts and at their forward ends to the inwardly-projecting arm $b^9$ and another similar arm $b^5$ on the frame-base of the machine. The several rock-shafts Q Q′ Q² Q³ are provided with rigid radial arms $q^6$ $q^7$ $q^8$, which are connected by means of links $q^9$, $q^{10}$, and $q^{11}$ with the lower or vertical ends of bell-crank levers R, R′, and R², Fig. 3. Said bell-crank levers are mounted on a transverse shaft R⁷, located at the top of the frame-base between upwardly-projecting flanges thereon, and their horizontal arms are connected with the sliding stop-bars O O² O³ by means of connecting-rods $r$, $r'$, and $r^2$. The rock-shaft Q′, which actuates the stop-bar O′, is provided with a horizontal rigid arm Q⁴, which is directly connected with said stop-bar by a vertical rod $r^3$, for a purpose hereinafter stated. Each of the rock-shafts Q to Q³ is actuated by a limited number of the key-actuating bars B², and each one of said bars is provided with one or in some cases two stop projections, so that the same bar will give motion to one or in some instances two of said rock-shafts, it being understood that the stop projections shown in Fig. 5 represent those nearest the eye of the several rows of pins, of which only one or two are attached to the same bar.

From the construction described it will be seen that the shaft L will be held from turning under the pressure of the carriage-actuating spring by engagement of the ratchet either with the detent $m'$ or the pawl $n'$, and that when the pawl $n'$ is engaged with the ratchet-wheel the turning of the latter will be prevented by contact of the detent-arm N with the stop-arm N', as seen in Fig. 3.

It will be further seen that when the pawl is engaged with the ratchet-wheel and the arm B is in contact with the stop-arm N', if the bar M be depressed to release the pawls $n'$ and engage the detent-tooth $m'$ with the ratchet-wheel, the detent-arm will be swung by the spring until arrested by contact of one of the stop-bars O to $O^3$ or by contact with the end stop $q^5$. The extent of angular movement of the pawl and detent-arm under the action of the spring will obviously depend upon which one of the stop-bars may be lifted at the time. As the said stop-bars and the end stop $O^5$ are separated from each other by angular distances, each equal to the length of one of the ratchet-teeth, measured in degrees, it follows that the detent-arm will be turned an angular distance of one, two, three, or more teeth, according to the stop-bar which is then projected into the path of the said arm, or in case the said bars shall have all been withdrawn according to the distance from the stop-bar N' to the end stop $o^5$. The tooth $m'$ also stands in fixed relation to the several stop-bars and the end stop, so that whenever the bar N is depressed the said tooth will engage and hold the ratchet-wheel in the same position in which it was held by the stop-bar or end stop. It follows that when one of the stop-bars is lifted in position to arrest movement of the arm N the depression of the bar M will release said arm and allow the latter (which had theretofore been held from turning by its engagement with the ratchet-wheel) to swing back and thus carry its pawl $n^5$ into position for engagement of another tooth of the ratchet, the movement of the arm being through a distance equal to the angular distance of the stop-bar which is then in position to arrest the arm from the starting-point of said arm, such starting-point being the position at which it stands when released. Consequently when the detent-tooth and pawl are vibrated by the successive operations of the keys the shaft L will be caused to revolve intermittingly or by a step-by-step movement by the force of the carriage-actuating spring, and the extent of such movement of the shaft and the corresponding movement of the carriage will be determined by the extent to which the detent-arm has been previously allowed to turn on the detent-bar by the action of the spring $N^2$ before having its movement arrested by one of the stop-bars or by the end stop $o^5$. The forward movement of the carriage and the attendant rotary movement of the shaft of course takes place immediately after and in consequence of the retraction of the detent-tooth from engagement with the ratchet-wheel, or, in other words, upon the release of key from pressure. Each time the shaft is thus turned by the action of the carriage-actuating spring the spring $N^2$, which turns the detent-arm, must of course be under its maximum tension, to which end it must be of such proportionate strength that it may be readily overcome by the force of the carriage-actuating spring, while sufficiently strong to promptly turn the said arm the greatest distance the latter may require to be moved.

In order that the device may be operated with as little power as practicable, I prefer to arrange the stop-bar which causes an extent of feed motion common to the greatest number of keys so that it will occupy normally or usually an elevated position, or will commonly stand in the path of the arm N, so that movement of that particular stop-bar will be unnecessary except when the arm needs to pass it for reaching other stop-bars, in which case said normally-elevated bar will be depressed. Inasmuch as, in a machine having five units of movement, the unit common to the greatest number of types will be that of two units, the stop-bar O', which affords two units of movement, is herein shown as arranged to stand normally elevated, so that the arm N will always strike this bar unless the stop-bar O be elevated, or unless the bar O' be depressed and either the bars $O^2$ $O^3$ or the stationary stop $o^5$ be brought into action. The withdrawal of the two-unit stop-bar O' instead of its advancement is accomplished by its direct connection of the rock-shaft Q' with the said stop-bar, as hereinbefore described, whereby said stop-bar O' will be withdrawn through a movement of the key-actuating bars $B^2$ in the same direction by which the other stop-bars are elevated. Inasmuch, however, as the withdrawal of the two-unit-space stop-bar O' is needed at the same time that the stop-bars $O^2$ and $O^3$ are elevated, it follows that all of the type-actuating bars $B^2$, which are constructed to actuate the said stop-bars $O^2$ and $O^3$, must also be arranged to actuate the stop-bar O', and all of the bars which operate the stop-bars $O^2$ and $O^3$ will therefore be provided with two stop projections for engagement of the blades of two rock-shafts, one of said stop projections in the case of each key serving to actuate and depress the stop-bar O', while the other actuates and elevates a stop-bar $O^2$ or $O^3$. Moreover, inasmuch as the withdrawal of the stop bar O' is necessary to enable the arm N to reach the end stop $o^5$ for giving the greatest extent of feed movement, it follows that the actuating-bars $B^2$ of all the types requiring the greatest extent of feed must have a stop projection engaging the flange of the rock-shaft Q', which serves to withdraw the said two-unit-space stop-bar O'.

It will further be understood that the number of stops or stop-bars and the number of rock-shafts for actuating the same may be increased or decreased to provide for a greater or less number of type-groups, and it follows that the machine may be provided with type characters or words of any desired width, it being only necessary to add a stop-bar and actuating device therefor for each additional width of type to be provided for.

In order to enable the carriage to be released from the control of the automatic feed mechanism when it is desired to move the carriage by hand—as, for instance, in inserting a letter in place of an erased one—I have provided a device as follows: $N^2$ is a lever which is pivoted to the rear of and adjacent to the free end of the detent-arm N and adjacent to the face of the yoke $O^4$. Said lever is arranged to swing in a vertical plane and normally stands in an approximately horizontal position. Near it free end it is provided with an arm or dog $N^3$, so located as to come in contact with a part of or attached to the pawl $n'$, in this instance it being arranged for contact with the screw-stud $n^6$. The dog $N^3$ is herein shown as attached to an upwardly-extending portion of the lever $N^2$; but it may be attached in any desired manner to said lever provided it be located in position to engage the pawl $n'$ to shift the position of the same. The free end of the lever $N^2$ is connected with a vertically sliding rod $N^4$, which passes through the top plate of the machine, and is provided at its upper end with a button $N^5$, by which the rod may be depressed against the action of a lifting-spring $N^6$, which tends to hold it and the free end of the lever $N^2$ in an elevated position, as herein shown. The spring $N^6$ is a coiled spring placed between the button $N^5$ and the top plate; but it may be otherwise arranged as desired. The actuating-arm $N^3$ of the lever $N^2$ is held by the spring $N^6$ normally above and free from contact with the stud $n^6$ at the time the frame N is in contact with the stop-arm N', this being the position which it maintains at times when the machine is at rest, as seen in Figs. 3 and 15. If when the parts are in this position the lever $N^2$ be depressed by pressing downwardly on the button, the pawl $n'$ will be released from the ratchet-wheel, and the latter will then be free to turn, so that the carriage may be moved back and forth by hand freely and without restriction. When the carriage has been brought to a desired point, release of pressure on the button $N^5$ will allow the lever $N^2$ to rise and thus permit the reëngagement of the pawl with the ratchet-wheel.

It will be noted that the part herein termed the "pawl" $n'$ does not in the usual operation of the feeding device perform the function of a "pawl," as that term is commonly used, but that it acts merely as the detent or pallet of an escape mechanism to control the advance movement of the ratchet, acting as a pawl only when the ratchet is turned backward in the backward movement of the carriage. If, therefore, said pawl be not required to enable the carriage to be moved backward, said pawl need not be movable, but would then form merely a stationary projection on the swinging-arm N.

As an improved means of mounting the several pivot-rods for the bell-crank levers, the rock-shafts, and the cross-bars which support the key-actuating bars in the machine-frame base, I provide within said base a separate or auxiliary frame consisting of side pieces $A^6$ and a rear cross-piece $A^7$, preferably made integral with each other, the same being constructed to fit closely within and against the side and rear walls of the frame-base A. The bell-crank pivot-rods are attached directly to the side pieces $A^6$, while the rock-shafts are mounted in suitable bearing-apertures therein. The cross-bars which support the key-actuating bars are attached to the lower edges of said pieces $A^6$, preferably by means of depending projections on the side pieces, which are employed in order to avoid making the side pieces unduly wide and heavy. As a means of detachably securing the inner frame to the base A, said inner frame and base is shown as provided with inwardly-projecting lugs $a^5$ and $a^6$, through which are inserted holding bolts or screws $a^7$. The employment of such inner or auxiliary frame as a support for the several working parts within the frame-base has the important advantage of enabling all of said parts to be removed from the frame for adjustment and repairs, while greatly facilitating the original construction and assembling of the parts.

An alarm-bell mechanism of simple form is provided on the machine illustrated, the same being shown in Fig. 22 and made as follows: R indicates a bell, which is supported beneath the top plate at the front of the machine by means of a bracket R', and S indicates a bell-hammer lever arranged vertically and pivoted at $s$ beneath the top plate, with its short upper arm $s'$ extending above the top plate at the rear of the front bar D' of the carriage-frame. Secured to said bar is an adjustable block S', carrying a swinging trip-dog $S^2$, which depends from the block in such position as to strike the upper end $s'$ of the hammer-lever as the carriage moves from right to left, said dog $S^2$ being pivoted at the right-hand side of the block S' and is adapted to bear at its right-hand side against an abutting surface or shoulder thereof, so that the dog is prevented from swinging from its vertical position toward the right, but is perfectly free to swing in the opposite direction or toward the left, so that it will pass over the bell-hammer lever in the backward movement of the carriage. Said block S' is adjustably secured on the front bar of the carriage-frame by means of a slot $D^{13}$ on said bar, into which fits a flange or projection on the block, the block being adjustably secured in the desired position by means of a thumb-screw $D^{14}$, inserted through the slot from the front face of the carriage and therefore in convenient position for the hand of the operator. Adjustment of the sliding block S' and a trip-dog thereon obviously enables the action of the alarm-bell to be controlled in accordance with the width of the paper on which the printing is being done. The bell-hammer is in this instance actuated solely by gravity; but the hammer may be a spring-actuated one with the same result as far as operation of the tripping device is concerned.

I claim as my invention—

1. As a means of controlling the feed motion of a type-writing machine, a ratchet-wheel which is given motion by the paper-carriage, a detent-bar which reciprocates in a plane parallel with the plane of the ratchet-wheel and is provided with a detent-tooth engaging the wheel at one side of the latter, a spring-actuated, oscillatory detent-arm pivoted to said bar and adapted to engage the said wheel at the opposite side thereof, said detent-tooth and detent-arm being moved in the plane of the ratchet-teeth alternately into and out of engagement with the same, a plurality of separately-movable stops adapted to limit the movement of the said detent-arm with relation to the detent-bar, and operative connections between the keys and said detent-bar and stops for actuating the same, substantially as described.

2. As a means for controlling the feed motion of a type-writing machine, a ratchet-wheel which is given motion by the paper-carriage, a detent-bar which reciprocates in a plane parallel with the plane of the ratchet-wheel and is provided with a detent-tooth engaging said wheel at one side of the latter, a spring-actuated oscillatory detent-arm pivoted to said bar and adapted to engage the said wheel at the opposite side thereof, said detent-tooth and detent-arm being moved in the plane of the ratchet-teeth alternately into and out of engagement with the same, a plurality of stops, consisting of separately-movable longitudinal sliding bars arranged in the same plane with the detent-arm and adapted to limit the movement of the same and operative connections between the keys and said detent-bar and stop-bars for actuating the same, substantially as described.

3. As a means for controlling the feed motion of a type-writing machine of that class having endwise-reciprocatory key-actuating bars, a ratchet-wheel actuated by the paper-carriage, a detent-bar which reciprocates in a plane parallel with the plane of the ratchet-wheel and is provided with a detent-tooth engaging the wheel at one side of the latter, a spring-actuated oscillatory detent-arm pivoted to said bar and adapted to engage said wheel at the opposite side thereof, said detent-tooth and detent-arm being moved in the plane of the ratchet-teeth alternately into and out of engagement with the same, a plurality of separate movable stops adapted to limit the movement of the detent-arm with relation to the detent-bar, a plurality of rock-shafts extending transversely of the key-actuating bars and each of which is actuated by one or more of said bars through the medium of projections thereon and operative connections between said rock-shafts and said detent-bar and stops, substantially as described.

4. As a means for controlling the feed motion of a type-writing machine of that class in which motion is transmitted from the keys to the types through the medium of endwise-reciprocatory key-actuating bars, a ratchet-wheel which is given motion by the paper-carriage, an endwise-reciprocating detent-bar moving transversely with relation to the ratchet-wheel and provided with a detent-tooth engaging the wheel at one side of the latter, an oscillatory spring-actuated detent-arm pivoted to said bar and adapted to engage the said wheel at the opposite side thereof, an endwise-sliding stop-bar, a rock-shaft mounted transversely of the key-actuating bars and provided with a wing which is engaged with each of the last-named bars, said rock-shaft having an arm which is pivoted to the detent-bar, another rock-shaft for actuating the stop-bar provided with a wing adapted for contact with projections on said key-actuating bars and a bell-crank lever connecting the last-named rock-shaft with the said stop-bar, substantially as described.

5. As a means for controlling the feed motion of a type-writing machine of that class having endwise-reciprocatory key-actuating bars, a ratchet-wheel which is moved by the paper-carriage, an endwise-reciprocating detent-bar arranged transversely with relation to the ratchet-wheel and provided with a detent-tooth engaging the wheel at one side of the latter, an oscillatory, spring-actuated detent-arm pivoted to said bar and adapted to engage the said wheel at the opposite side thereof, a plurality of endwise-sliding stop-bars and means for actuating the detent-bar and stop-bars consisting of a plurality of rock-shafts having wings which are acted on by projections of the key-actuating bars, one of said rock-shafts having a rigid arm directly connected with the detent-bar another of said rock-shafts having a rigid arm directly connected with one of the stop-bars and another rock-shaft having a rigid arm which is connected with another slide-bar through the medium of a bell-crank lever, substantially as described.

6. The combination with a machine-frame comprising a rectangular base-casting, endwise-reciprocatory key-actuating bars, bell-crank levers for transmitting motion from the keys to the bars and from the bars to the type-levers, transverse pivot-rods supporting said bell-crank levers, transverse rock-shafts, extending over the bars, for actuating the feed devices and transverse supporting-bars beneath the key-actuating bars, of a separate rectangular inner frame consisting of side and end bars made separate from and fitting within the base-casting of the frame, said inner frame affording support for the several pivot-rods, rock-shafts and cross-bars, and being detachably secured within the frame-base, substantially as described.

7. As a means for controlling the feed motion of a type-writing machine, a ratchet-wheel actuated by the paper-carriage, a detent-bar which reciprocates in a plane parallel with the plane of the ratchet-wheel and is provided with a detent-tooth engaging the wheel at one side of the latter, a spring-actuated oscillatory detent-arm pivoted to said bar, a spring-pawl mounted on said arm and adapted to engage the said wheel at the side thereof opposite the detent-tooth, and a plurality of separate movable stops to limit the movement of the detent-arm, substantially as described.

8. As a means for controlling the feed motion of a type-writing machine, a ratchet-wheel actuated by the paper-carriage, a detent-bar reciprocating transversely with relation to the ratchet-wheel and provided with a detent-tooth engaging the wheel at one side of the latter, a spring-actuated oscillatory detent-arm pivoted to said bar, a spring-pawl mounted on said arm and adapted to engage the said wheel at the side thereof opposite the detent-tooth, a plurality of separately-movable stops to limit the movement of the detent-arm, and a spring-actuated releasing-dog located in position to engage said spring-pawl when the detent-arm is at the rearward limit of its movement, said dog being provided with a finger-piece for moving the same, substantially as described.

9. The combination with a ratchet-wheel which is given motion by the paper-carriage, of a detent-bar reciprocating transversely with relation to the ratchet-wheel and provided with a detent-tooth engaging the wheel at one side of the latter, a spring-actuated, oscillatory detent-arm, a spring-pawl mounted on said detent-arm, a pivoted lever provided with a releasing-dog adapted to engage the said pawl, a finger-piece connected with said lever and a spring applied to move the said lever, substantially as described.

10. The combination with laterally-sliding ribbon-spools and sliding frames mounted on the upper part of the frame and engaging with said spools, of a carriage spring-drum, a cam attached thereto, an upright bar mounted to slide vertically on the machine-frame adjacent to the said cam and provided with a pin which engages the cam, and a bell-crank lever mounted to swing in a plane parallel with the axes of the ribbon-spools, said lever having a horizontal arm which is engaged with said vertically-sliding bar and with a vertical arm which extends to the upper part of the frame and which is connected with and actuates the said sliding frames, substantially as described.

11. The combination with sliding ribbon-spools movable laterally on the machine-frame and sliding frames mounted on the upper part of the machine-frame and engaging said spools, of a horizontal rock-shaft mounted at the lower part of the frame and having upwardly-extending rigid arms reaching to the upper part of the frame and connected with the said sliding frames, a carriage spring-drum, a cam on the same, an upright sliding bar mounted to slide vertically on the machine-frame adjacent to the cam and provided with a pin which engages the cam, and a bell-crank lever mounted to swing in a vertical plane parallel with the axes of the ribbon-spools and having a horizontal arm which engages said vertically-sliding bar, and a vertical arm which is connected with one of the rigid arms on the rock-shaft, substantially as described.

12. The combination with laterally-movable ribbon-spools, of sliding frames mounted on the upper part of the machine-frame and engaging said spools, levers pivoted to the top of the machine-frame and arranged to swing in horizontal planes, the free ends of said levers being connected with the said sliding frames, transversely-arranged horizontal slide-bars mounted in the upper part of the machine-frame and connected with said levers, a connection between the slide-bars at the opposite end of the machine-frame by which they are moved together, a carriage spring-drum, a cam attached to the drum, an upright bar mounted to slide vertically on the machine-frame adjacent to the cam and provided with a pin which engages the cam, and a bell-crank lever mounted to swing in a plane parallel with the axes of the spools and having a horizontal arm which engages said vertically-sliding bar, and a vertical arm which rises to the upper part of the machine-frame and is connected with one of said horizontal slide-bars, substantially as described.

In testimony that I claim the foregoing as my invention I affix my signature, in presence of two witnesses, this 21st day of June, A. D 1895.

CHARLES S. ELLIS.

Witnesses:
C. CLARENCE POOLE,
ALBERT H. GRAVES.